US012643327B2

(12) United States Patent
Takahashi

(10) Patent No.: US 12,643,327 B2
(45) Date of Patent: Jun. 2, 2026

(54) WIPING DEVICE AND LIQUID DISCHARGE APPARATUS

(71) Applicant: Kenta Takahashi, Kanagawa (JP)

(72) Inventor: Kenta Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 266 days.

(21) Appl. No.: 18/603,272

(22) Filed: Mar. 13, 2024

(65) Prior Publication Data

US 2024/0326442 A1 Oct. 3, 2024

(30) Foreign Application Priority Data

Mar. 27, 2023 (JP) ................................ 2023-049322

(51) Int. Cl.
*B41J 2/165* (2006.01)

(52) U.S. Cl.
CPC .... *B41J 2/16544* (2013.01); *B41J 2002/1655* (2013.01)

(58) Field of Classification Search
CPC ...................... B41J 2/16544; B41J 2002/1655
See application file for complete search history.

(56) References Cited

U.S. PATENT DOCUMENTS 10,611,157 B2 * 4/2020 Asano .................. B41J 2/16535
2016/0325550 A1 11/2016 Masaoka et al.
2019/0184709 A1 6/2019 Hasebe et al.
2019/0255854 A1 8/2019 Asano et al.
2020/0079091 A1 3/2020 Takahashi et al.
2020/0247126 A1 * 8/2020 Kikuchi ............... B41J 2/16508
2021/0394516 A1 12/2021 Takahashi
2022/0305796 A1 9/2022 Takahashi et al.
2022/0305797 A1 9/2022 Takahashi et al.
2023/0202180 A1 6/2023 Matsumoto et al.

FOREIGN PATENT DOCUMENTS

JP 2016-087939 A 5/2016
JP 2020-121541 A 8/2020
JP 2022-161141 A 10/2022

* cited by examiner

*Primary Examiner* — Sharon Polk
(74) *Attorney, Agent, or Firm* — XSENSUS LLP

(57) ABSTRACT

A wiping device includes a web windable for a winding length; a memory; circuitry configured to: cause the web to wipe in a wiping direction: a first head to discharge a first type of liquid; and a second head to discharge a second type of liquid different from the first type of liquid; and cause the memory to store information about one of the first head or the second head that has been previously wiped with the web; and change the winding length of the web based on a combination of: the information about the one of the first head or the second head stored in the memory; and information about another of the first head or the second head to be wiped after the one of the first head or the second head.

6 Claims, 14 Drawing Sheets

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

| WINDING LENGTH | PREVIOUS OPERATION | CURRENT OPERATION | RELATION OF LENGTH |
|---|---|---|---|
| L2 | FIRST PRESSING BODY | FIRST PRESSING BODY | L3 > L2 > L1 |
| L1 | FIRST PRESSING BODY | SECOND PRESSING BODY | |
| L3 | SECOND PRESSING BODY | FIRST PRESSING BODY | |
| L2 | SECOND PRESSING BODY | SECOND PRESSING BODY | |

WIPING DEVICE AND LIQUID DISCHARGE APPARATUS

CROSS-REFERENCE TO RELATED APPLICATIONS

This patent application is based on and claims priority pursuant to 35 U.S.C. § 119 (a) to Japanese Patent Application No. 2023-049322, filed on Mar. 27, 2023, in the Japan Patent Office, the entire disclosure of which is hereby incorporated by reference herein.

BACKGROUND

Technical Field

The present disclosure relates to a wiping device and a liquid discharge apparatus.

Related Art

A head that discharges liquid from a nozzle is provided with a maintenance and recovery mechanism (head maintenance device) including a cap that caps a nozzle face of the head and a wiping device that wipes and cleans the nozzle face in order to maintain and recover the state of the nozzle.

SUMMARY

According to an embodiment of the present disclosure, a wiping device includes a web windable for a winding length; a memory; circuitry configured to: cause the web to wipe in a wiping direction: a first head to discharge a first type of liquid; and a second head to discharge a second type of liquid different from the first type of liquid; and cause the memory to store information about one of the first head or the second head that has been previously wiped with the web; and change the winding length of the web based on a combination of: the information about the one of the first head or the second head stored in the memory; and information about another of the first head or the second head to be wiped after the one of the first head or the second head.

According to an embodiment of the present disclosure, a liquid discharge apparatus includes the wiping device; and multiple heads including the first head and the second head . . .

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
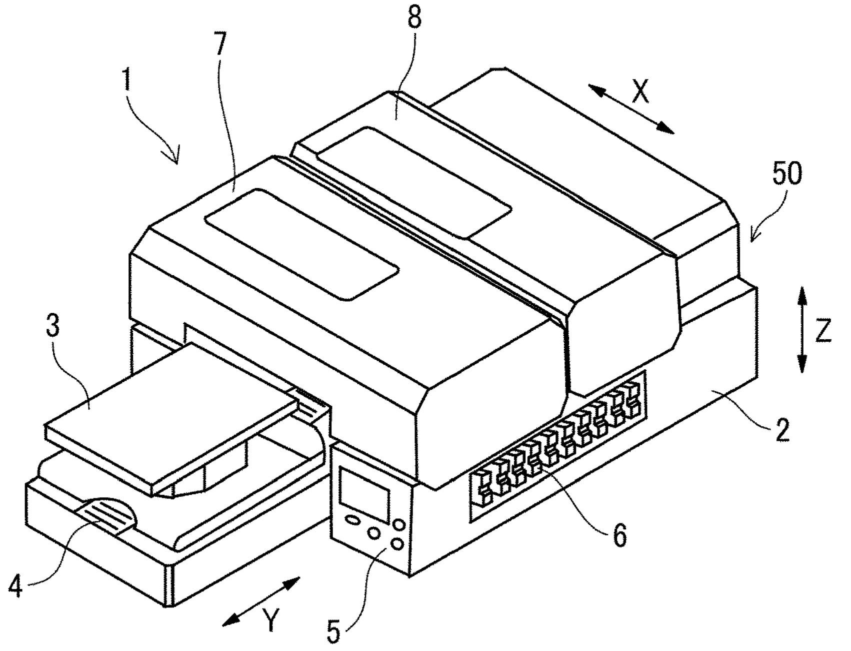
FIG. 1 is a perspective view of a printer as a liquid discharge apparatus according to a first embodiment of the disclosure with covers of the printer closed.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

A known head includes a wiping member that wipes a discharge port face of a recording unit having a first discharge port array through which ink is discharged and a second discharge port array through which a reaction liquid that reacts with the ink is discharged, a first pressing body that forms a first wiping portion that wipes the first discharge port array, and a second pressing body that forms a second wiping portion that wipes the second discharge port array. The first pressing body and the second pressing body are located at different positions of the wiping member.

When wiping of multiple wiping targets from which different liquids are discharged is performed with a common web, the web is wound by the maximum winding length for wiping with a portion of the web that has not wiped so that the different liquids are not mixed with each other. Thus, there is a disadvantage that the amount of use of the web increases.

With the embodiments of the present disclosure, a web can be efficiently used.

Figure 2:
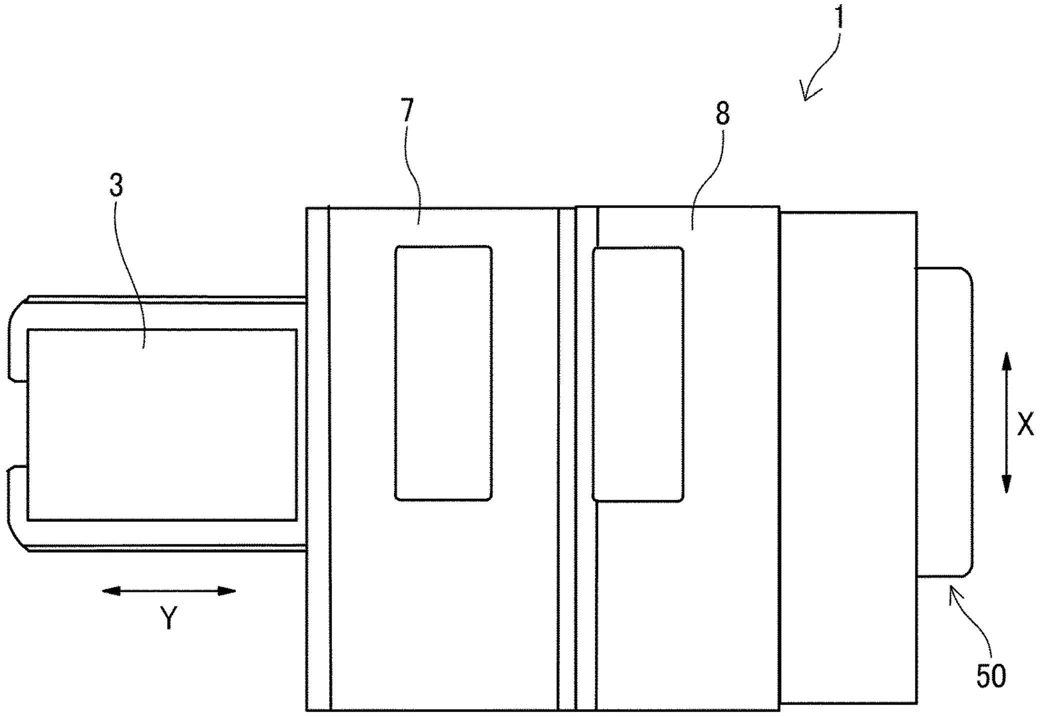
FIG. 2 is a plan view of the printer of FIG. 1 with the covers closed.
Figure 3:
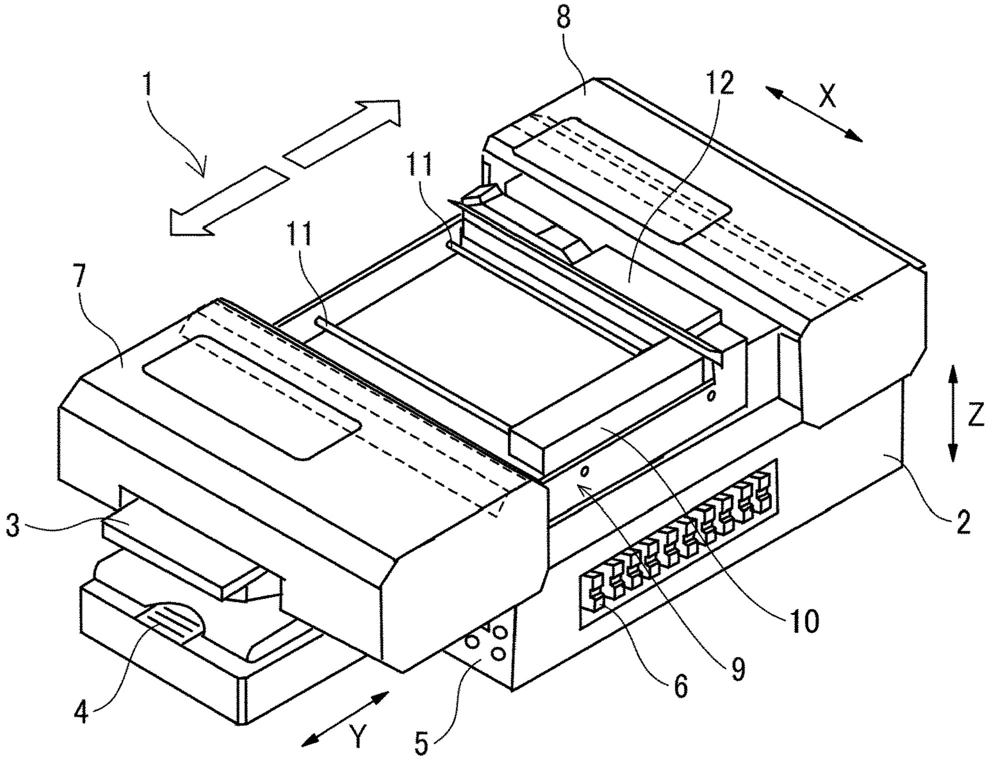
FIG. 3 is a perspective view of the printer of FIG. 1 with the covers open.
Figure 4:
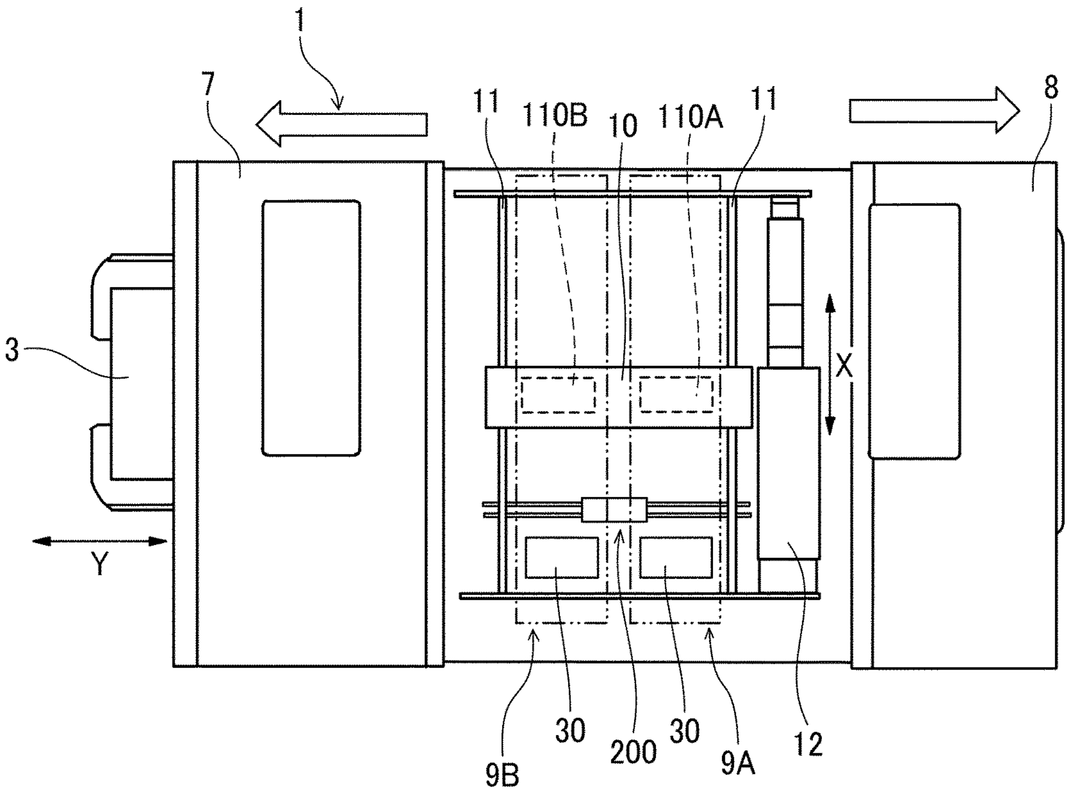
FIG. 4 is a plan view of the printer of FIG. 1 with the covers open.

Embodiments of the present disclosure are described below referring to the accompanying drawings. A printer as a liquid discharge apparatus according to a first embodiment of the disclosure is described referring to FIGS. 1 to 4. FIG. 1 is a perspective view of the printer with covers closed. FIG. 2 is a plan view of the printer with the covers closed. FIG. 3 is a perspective view of the printer with the covers open. FIG. 4 is a plan view of the printer with the covers open.

In the present embodiment, a direction (main scanning direction) X in FIG. 1 is a transverse direction of the printer and a moving direction of a head, a direction (sub-scanning direction orthogonal to the main scanning direction) Y is a front-rear direction of the printer and a medium conveyance direction, and a direction Z is a vertical direction. The direction X and the direction Y are parallel to a surface, onto which liquid is discharged, of a medium on a stage, but may have some error. The directions X, Y, and Z are orthogonal to each other.

A printer 1 according to the present embodiment includes a stage 3 that is movable in the direction Y in a housing 2. The stage 3 is mounted on a guide rail 4 extending in the direction Y. An operation panel 5 is disposed on a front face of the housing 2. A liquid cartridge 6 is detachably attached to a side face of the housing 2. A front cover 7 and a rear cover 8 as covers are disposed over the housing 2.

The stage 3 has a flat upper face on which the medium is placed. The upper face of the stage 3 is parallel to the direction X and the direction Y. The stage 3 moves on the guide rail 4 to reciprocate in the direction Y (both the front direction and the rear direction). The stage 3 is movable up and down in the direction Z to adjust the height of the medium placed on the stage 3.

The front cover 7 and the rear cover 8 are movable in the direction Y (both the front direction and the rear direction). In FIG. 1, the front cover 7 has been moved backward and the rear cover 8 has been moved forward to close the front cover 7 and the rear cover 8. On the other hand, in FIG. 3, the front cover 7 has been moved forward and the rear cover 8 has been moved backward to open the front cover 7 and the rear cover 8.

As described above, the front cover 7 and the rear cover 8 are slidably opened and closed. As a result, an occupied space of the printer 1 including an opening and closing space of the front cover 7 and the rear cover 8 can be reduced as compared with a configuration in which a front cover and a rear cover are opened and closed, for example, in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

An apparatus body 50 of the printer 1 includes the housing 2 and two liquid discharge units 9 (9A and 9B) provided on the housing 2. In the present embodiment, in particular, the apparatus body 50 is a portion of the printer 1 except the front cover 7 and the rear cover 8. The front cover 7 and the rear cover 8 are slidable in the direction Y relative to the apparatus body 50.

When the front cover 7 and the rear cover 8 are opened, the liquid discharge units 9 in the printer 1 are open to the outside. Since the liquid discharge units 9 are open to the outside, a head maintenance device 30, a head, and the periphery of the head can be cleaned, or a carriage can be replaced.

The front cover 7 and the rear cover 8 are closed during image formation. Thus, the liquid discharge units 9B and 9A are covered with the front cover 7 or the rear cover 8. Operating units such as a carriage of the liquid discharge units 9A and 9B are no longer accessible from the outside.

Since the liquid discharge units 9B and 9A are disposed in a space closed with the front cover 7 or the rear cover 8, mist can be prevented from being scattered to the surrounding area during a liquid discharge operation, an airflow can be circulated in the space closed with the front cover 7 or the rear cover 8 by fans provided in the liquid discharge units 9B and 9A, and generated mist can be circulated and collected in the space closed with the front cover 7 or the rear cover 8.

The printer 1 of the present embodiment includes the two liquid discharge units 9A and 9B disposed in the direction Y. The liquid discharge unit 9A discharges a pretreatment liquid. The liquid discharge unit 9B discharges, for example, a color ink and a white ink. The liquids discharged by the liquid discharge units 9A and 9B are not limited to the above-described liquids, and any one of a color ink (color liquid), a white ink (white liquid), and a pretreatment liquid may be discharged. In particular, when the medium is cloth, it is preferable to apply the pretreatment liquid before image formation with ink, and hence one of the liquid discharge units preferably discharges the pretreatment liquid.

The liquid discharge units 9A and 9B share a carriage 10, a guide rod 11, and an electrical portion 12 including a substrate and an electrical cover.

The guide rod 11 extends in the direction X. The carriage 10 is movable in the direction X along the guide rod 11. A first head 110A included in the liquid discharge unit 9A and a second head 110B included in the liquid discharge unit 9B are mounted on the carriage 10.

Head maintenance devices 30 that perform maintenance on the first head 110A of the liquid discharge unit 9A and the second head 110B of the liquid discharge unit 9B are provided outside a liquid discharge area, on one side in a left-right direction. A wiping device 200 shared by the first head 110A and the second head 110B is provided outside the liquid discharge area, on the side of the head maintenance devices 30.

An outline of an image forming process on a medium by the liquid discharge units 9 is described below.

A medium is placed on the stage 3. The stage 3 is moved along the guide rail 4 and is conveyed to the rear side of the printer 1. The pretreatment liquid is applied to the medium by the liquid discharge unit 9A. Specifically, the pretreatment liquid is applied to the medium in the direction X from a certain head of the first head 110A while the carriage 10 is moved in the direction X along the guide rod 11. This operation is repeated at each position in the direction Y to apply the pretreatment liquid to the medium.

Then, the stage 3 is moved forward in the direction Y, and liquids of respective colors are discharged onto the medium by the second head 110B of the liquid discharge unit 9B in a similar manner. When printing with white color is performed on a medium, for example, a white ink is discharged from a predetermined head of the second head 110B of the liquid discharge unit 9B, then the stage 3 is moved to the rear side of the liquid discharge unit 9B, and liquids of colors are discharged from a predetermined head 110 of the second head 110B onto the medium. Thus, an image can be formed on the medium.

Figure 5:
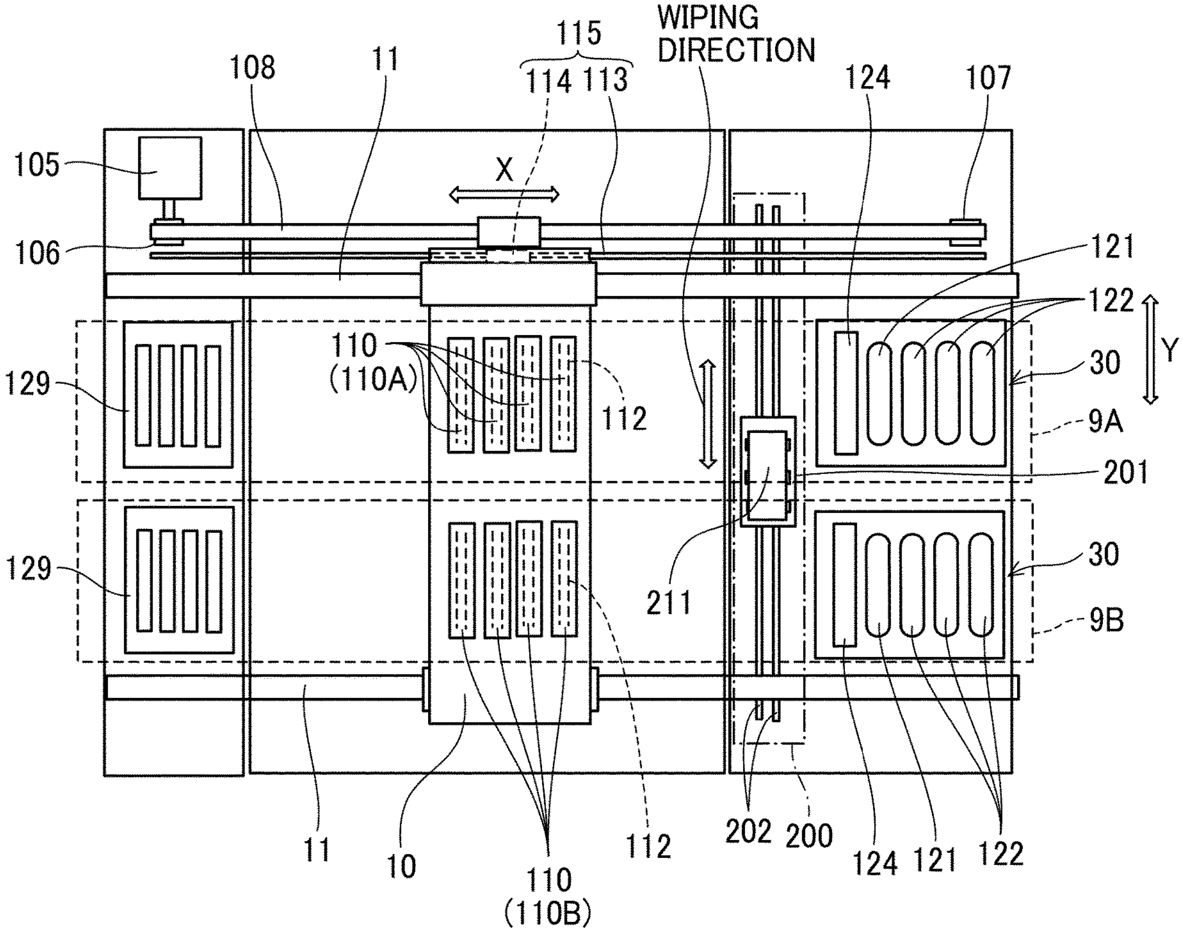
FIG. 5 is a plan view of an example of liquid discharge units.

An example of the liquid discharge units of the printer according to the present embodiment is described below referring to FIG. 5. FIG. 5 is a plan view of the liquid discharge units.

As described above, the liquid discharge units 9 (9A and 9B) share the carriage 10 that is held by two guide rods 11 bridged between left and right side plates so as to reciprocate in the main scanning direction X. The carriage 10 is reciprocated in the main scanning direction X by a main scanning motor 105 via a timing belt 108 looped around a driving pulley 106 and a driven pulley 107.

The first head 110A included in the liquid discharge unit 9A and the second head 110B included in the liquid discharge unit 9B are mounted on the carriage 10 at different positions in the sub-scanning direction Y. The first head 110A and the second head 110B each include four liquid discharge heads (hereinafter, simply referred to as "heads") 110 serving as liquid discharge portions. The heads 110 each have, for example, multiple discharge port arrays (nozzle arrays) each having multiple discharge ports (nozzles) 112 through which liquid is discharged.

An encoder scale 113 having a predetermined pattern is bridged between both side plates in the main scanning direction X. The carriage 10 is provided with an encoder sensor 114 including a transmissive photosensor that reads the pattern of the encoder scale 113. The encoder scale 113 and the encoder sensor 114 define a linear encoder (main scanning encoder) 115 that detects movement of the carriage 10.

The head maintenance devices 30 serving as a maintenance and recovery mechanism that maintains and recovers the heads 110 of the first head 110A and the second head 110B are disposed on one side in the main scanning direction X of the carriage 10. Idle discharge receivers 129 are disposed on the other side in the main scanning direction X of the carriage 10.

The head maintenance devices 30 each include, for example, a suction cap 121, three moisturizing caps 122, and an idle discharge receiver 124. The suction cap 121 also serves as one moisturizing cap. The suction cap 121 and the moisturizing caps 122 cap nozzle faces 111 (faces having nozzles) of the heads 110.

The wiping device 200 according to the first embodiment of the disclosure is disposed to extend over the two liquid discharge units 9A and 9B.

The wiping device 200 includes a web cartridge 201, a guide rail 202, and a drive mechanism. The web cartridge 201 includes a web 211 made of cloth or nonwoven fabric. The guide rail 202 guides the movement of the web cartridge 201 in a wiping direction. The drive mechanism moves the web cartridge 201 in the wiping direction. The web cartridge 201 may be mounted on the guide rail 202 via a cartridge holder, or may be directly mounted on the guide rail 202.

In the printer 1, when printing is performed on a fabric, the stage 3 is moved out of the apparatus body 50. When a fabric is placed on the stage 3 and a print start is instructed, the stage 3 is retracted into the apparatus body 50. Intermittent movement of the stage 3 in the sub-scanning direction Y, movement of the carriage 10 in the main scanning direction X, and discharge of liquid of a certain color from a head 110 onto the stopped fabric are repeated to print a certain image on the fabric.

To maintain and recover the head 110, the head 110 is moved to a position above the web cartridge 201, and the web cartridge 201 is moved in the wiping direction (the same as the direction Y) while the web 211 is in contact with the nozzle face of the head 110. Thus, contaminations such as residual liquid, a thickened or fixed object of the liquid, and dust adhering to the nozzle face of the head 110 are wiped off.

Figure 6:
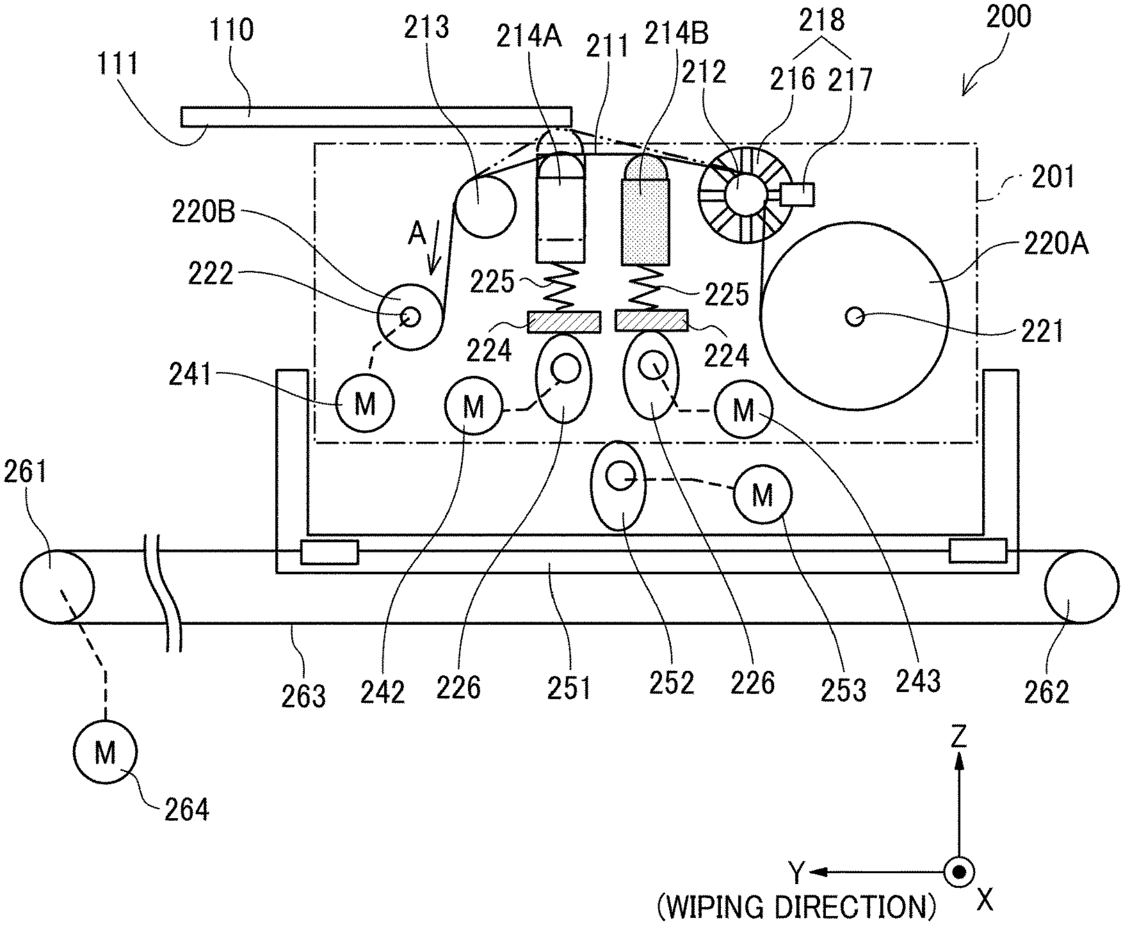
FIG. 6 is a side view of a wiping device according to the first embodiment of the disclosure.

The wiping device according to the first embodiment of the disclosure is described below referring to FIG. 6. FIG. 6 is a side view of the wiping device.

The wiping device 200 includes an endless web (long wiping member) 211 serving as a wiping member in a housing (cartridge case) of the web cartridge 201. The web 211 is a wiping member shared by the first head 110A and the second head 110B that are multiple heads that discharge different liquids. The web 211 wipes the first head 110A and the second head 110B.

The web 211 is fed from a feeding-side roll 220A wound around a feeding roller 221, is guided by guide rollers 212 and 213, and is wound on a winding-side roll 220B wound around a winding roller 222. The web 211 is fed in a feeding direction A when being wound on the winding-side roll 220B.

The web 211 is preferably made of a sheet-shaped material that has absorbency and resistance to at least liquid to be used, and that does not fuzz or generate dust. Examples of the material include nonwoven fabric, cloth, film, and paper.

A first pressing body 214A (or a first pressing part) and a second pressing body 214B (a second pressing part) are disposed between the guide roller 212 and the guide roller 213. The first pressing body 214A and the second pressing body 214B each press the web 211 against the nozzle face 111 of the head 110 serving as a wiping target. The first pressing body 214A is disposed on the downstream side and the second pressing body 214B is disposed on the upstream side in the feeding direction A (or the wiping direction) of the web 211.

The first pressing body 214A and the second pressing body 214B each are held by a holder 224 via a pressure spring 225, and each are disposed integrally with the holder 224 and the pressure spring 225 in a manner movable up and down in the Z direction (vertically movable). Thus, the first pressing body 214A and the second pressing body 214B each are movable between a contact position at which the first pressing body 214A or the second pressing body 214B presses the web 211 against the head 110 and a separated position (or retracted position) separated from the contact position.

When a wiping target head is the first head 110A, the first pressing body 214A moves from the separated position (or the retracted position) indicated by a solid line to the contact position indicated by an imaginary line, and causes the web 211 to come into contact with the nozzle face 111 of the head 110 of the first head 110A.

When the wiping target head is the second head 110B, the second pressing body 214B moves from the separated position indicated by a solid line to the contact position, and causes the web 211 to come into contact with the nozzle face 111 of the head 110 of the second head 110B.

While the wiping operation is not performed, both the first pressing body 214A and the second pressing body 214B move to the separated positions; however, one of the first pressing body 214A and the second pressing body 214B may be moved to the contact position. When both the first pressing body 214A and the second pressing body 214B are moved to the separated positions, an urging portion that urges the holders 224 in a direction toward the separated positions may be provided.

The winding roller 222 is rotationally driven (driven for winding) by a winding motor 241 via a gear train or the like. A cam member 226 that is in contact with the holder 224 is rotated by a first pressing body elevation motor 242 to move the first pressing body 214A between the contact position and the separated position. A cam member 226 that is in contact with the holder 224 is rotated by a second pressing body elevation motor 243 to move the second pressing body 214B between the contact position and the separated position.

A code wheel 216 is attached to the guide roller 212. An encoder sensor 217 including a transmissive photosensor that detects a pattern formed on the code wheel 216 is provided. The code wheel 216 and the encoder sensor 217 define an encoder 218 that detects the winding length (feed amount) of the web 211.

The web cartridge 201 is held by a movement member 251 in a manner movable up and down. A cam member 252 is rotated by a cartridge elevation motor 253 to move the web cartridge 201 up and down relative to the movement member 251. Alternatively, the web cartridge 201 may be configured not to move up and down.

The movement member 251 is coupled to a timing belt 263 that is looped around a driving roller 261 and a driven roller 262. When the driving roller 261 is rotated by a cartridge movement motor 264, the movement member 251 reciprocates in the sub-scanning direction Y that is the wiping direction along the guide rail 202.

Figure 7:
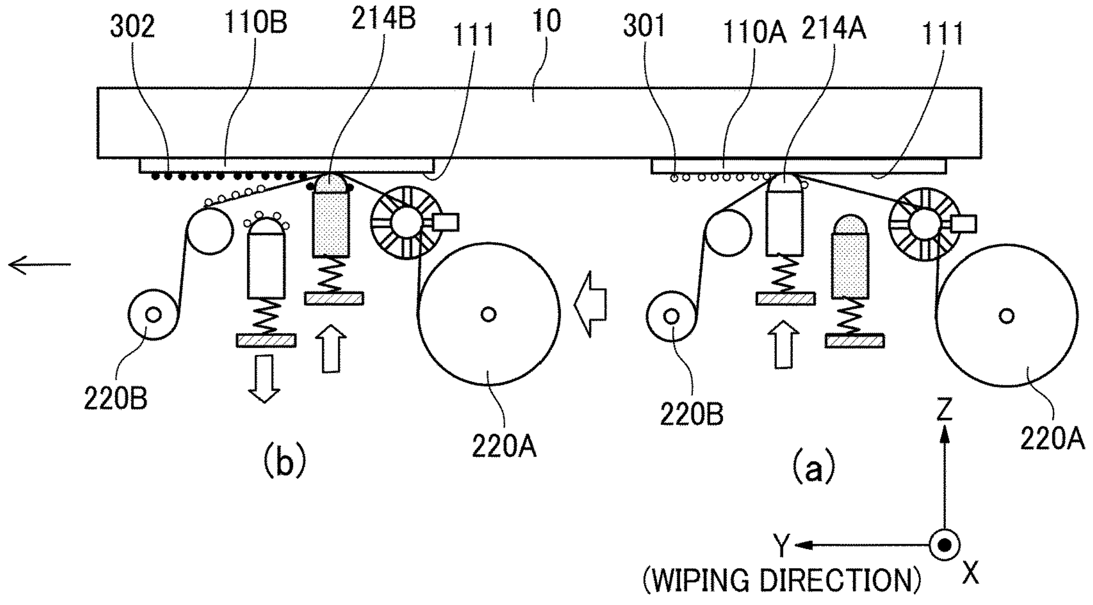
FIG. 7 is a side view illustrating an example of a wiping operation performed by the wiping device.

The wiping operation performed by the wiping device 200 is described referring to FIG. 7. FIG. 7 is a side view illustrating the wiping operation.

For example, when the web 211 of the wiping device 200 wipes the first head 110A and the second head 110B in this order, the first pressing body 214A is moved up in the Z direction to press the web 211 against the nozzle face 111 of the first head 110A as illustrated in FIG. 7(*a*). Then, the web cartridge 201 is moved in the wiping direction (sub-scanning direction Y) to wipe off a treatment liquid 301 remaining on the nozzle face 111 of the first head 110A with the web 211.

After the wiping operation on the nozzle face 111 of the first head 110A with the web 211 is ended, the winding roller 222 is rotationally driven to wind the web 211 by a predetermined winding length.

Then, as illustrated in FIG. 7(*b*), the first pressing body 214A is moved down in the Z direction to the separated position (or the retracted position), and the second pressing body 214B is moved up in the Z direction to press the web 211 against the nozzle face 111 of the second head 110B. Then, the web cartridge 201 is moved in the wiping direction (sub-scanning direction Y) to wipe off an ink 302 remaining on the nozzle face 111 of the second head 110B with the web 211.

As described above, the wiping device 200 includes the first pressing body 214A that presses the web 211 against the first head 110A and the second pressing body 214B that presses the web 211 against the second head 110B, as pressing bodies that press the web 211 against the nozzle faces 111.

Thus, when the first head 110A that discharges the treatment liquid and the second head 110B that discharges the ink reactive with the treatment liquid are wiped with the common web 211, a phenomenon in which the treatment liquid and the ink remaining on the pressing bodies react with each other and are solidified can be prevented.

Figure 8A:
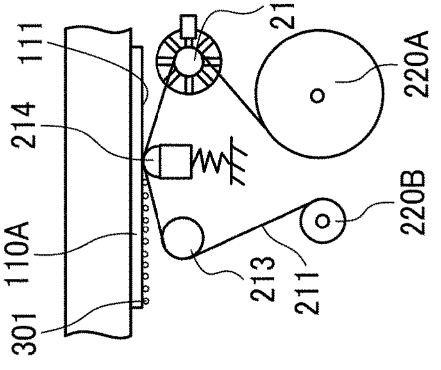
FIGS. 8A, 8B, and 8C are side views of a wiping device according to a first comparative example with a wiping operation.
Figure 8B:
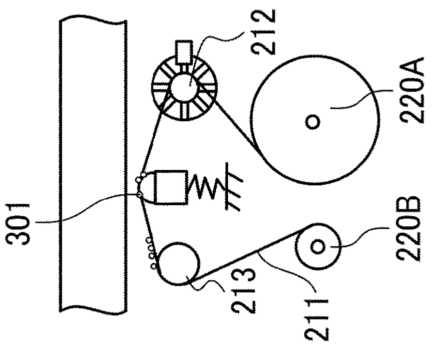
Figure 8C:
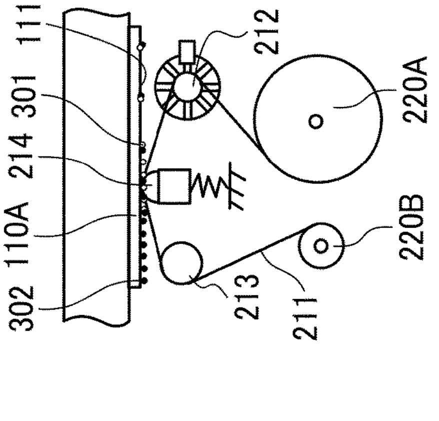
Figure 9A:
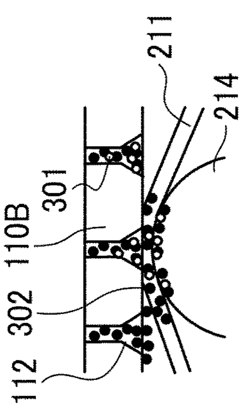
FIGS. 9A, 9B, and 9C are enlarged views of portions of pressing bodies of the wiping device of FIGS. 8A, 8B, and 8C.
Figure 9B:
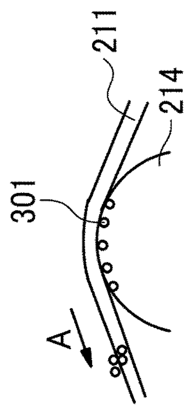
Figure 9C:
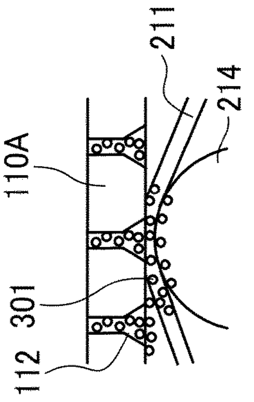

A wiping device according to a first comparative example is described referring to FIGS. 8A, 8B, 8C, 9A, 9B, and 9C. FIGS. 8A, 8B, and 8C are side views of the wiping device according to the first comparative example with a wiping operation. FIGS. 9A, 9B, and 9C are enlarged views of a portion of a pressing body of FIGS. 8A, 8B, and 8C.

The wiping device of the first comparative example includes a common pressing body 214 that presses a web 211 against a first head 110A and a second head 110B.

In the first comparative example, as illustrated in FIG. 8A, a wiping operation is performed in a state in which the pressing body 214 presses the web 211 against a nozzle face 111 of the first head 110A to wipe a treatment liquid 301 remaining on the nozzle face 111.

Then, as illustrated in FIG. 8B, the web 211 is wound and a new portion of the web 211 is made to face the pressing body 214. As illustrated in FIG. 8C, the wiping operation is performed in a state in which the pressing body 214 presses the web 211 against a nozzle face 111 of the second head 110B to wipe an ink 302 remaining on the nozzle face 111.

As illustrated in FIG. 9A, when the nozzle face 111 of the first head 110A is wiped, the treatment liquid 301 also adheres to the surface of the pressing body 214. As illustrated in FIG. 9B, even when the web 211 is fed, the treatment liquid 301 adhering to the surface of the pressing body 214 remains without being removed. Thus, as illustrated in FIG. 9C, when the pressing body 214 presses the web 211 against the nozzle face 111 of the second head 110B for wiping, the treatment liquid 301 remaining on the pressing body 214 may be transferred to the nozzle face 111 of the second head 110B.

Consequently, the treatment liquid 301 and the ink 302 may react with each other and be solidified on the nozzle face 111 of the second head 110B, thereby possibly causing clogging of nozzles 112. Even when the wiping sequence of the treatment liquid and the ink is inverted, nozzle clogging may similarly occur.

Moreover, the ink 302 scraped off by the web 211 and the treatment liquid 301 adhering to the pressing body 214 may react with each other and be solidified, and the resultant may be pushed into the nozzles 112 of the second head 110B, thereby possibly causing nozzle clogging.

Furthermore, when the ink 302 scraped off by the web 211 and the treatment liquid 301 adhering to the pressing body 214 react with each other and are solidified, the surface of the pressing body 214 becomes uneven, and wiping performance decreases.

Thus, by providing multiple pressing bodies to correspond to multiple heads that discharge different liquids as in the present embodiment, nozzle clogging and a decrease in wiping performance as in the first comparative example can be prevented from occurring.

Figure 10:
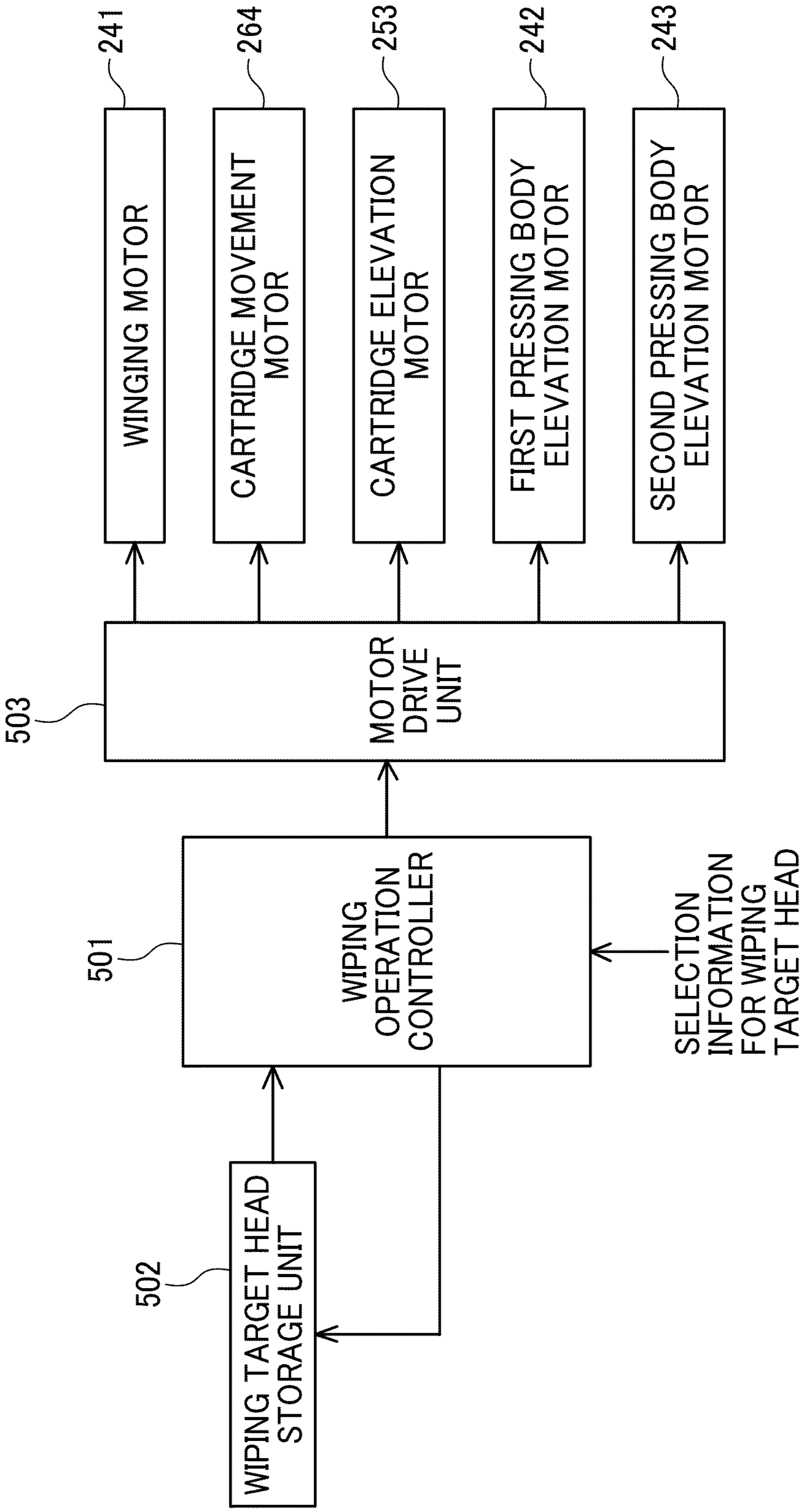
FIG. 10 is a block diagram illustrating a portion relating to control of the wiping device according to the first embodiment of the disclosure.

A portion relating to control of the wiping device 200 is described below referring to a block diagram of FIG. 10.

A wiping operation controller 501 is a controller that controls a wiping operation performed by the wiping device 200. The wiping operation controller 501 controls the driving of the winding motor 241, the cartridge movement motor 264, the cartridge elevation motor 253, the first pressing body elevation motor 242, and the second pressing body elevation motor 243 via a motor drive unit 503 to control the wiping operation.

A wiping target head storage unit 502 stores information about a previous wiping target head. The information about the previous wiping target head is stored, for example, when the wiping operation controller 501 performs the wiping operation on a wiping target head. The "information about a wiping target head" is information about a wiping target head itself, for example, information indicating either of the first head 110A and the second head 110B, or information indicating which one of the first pressing body 214A and the second pressing body 214B has been moved up.

When the wiping operation is performed on a wiping target head, the wiping operation controller 501 performs control to change the winding length in the winding operation based on a combination of information about a previous wiping target head stored in the wiping target head storage unit 502 and information about a current wiping target head.

Figure 11:
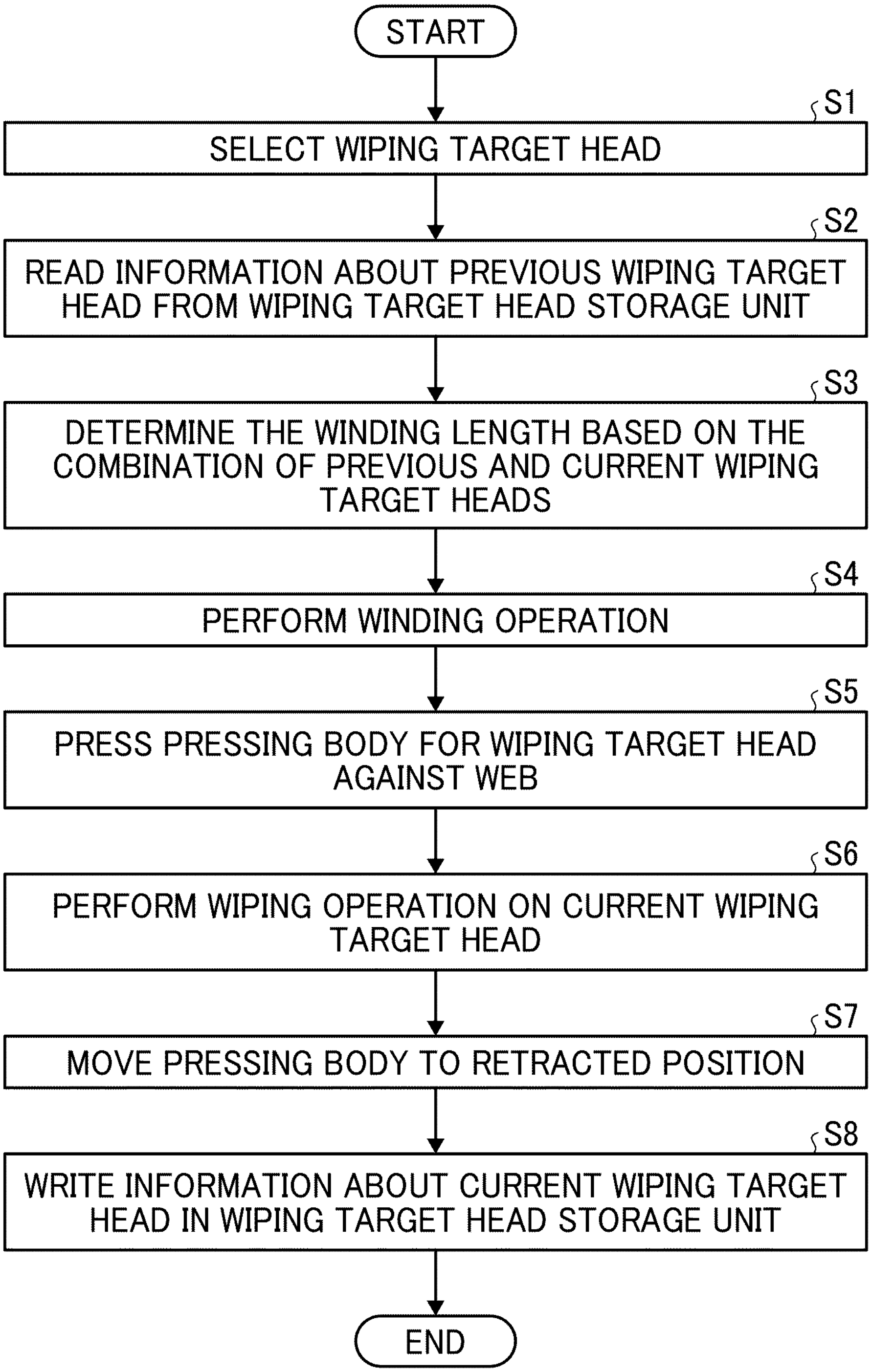
FIG. 11 is a flowchart presenting control of the wiping operation performed by a wiping operation controller of the wiping device according to the first embodiment of the disclosure.

Control of the wiping operation performed by the wiping operation controller is described below referring to a flowchart of FIG. 11.

When the wiping operation is started, the wiping operation controller 501 selects a current wiping target head based on selection information for a wiping target head (step S1, hereinafter simply referred to as "S1"). The selection information for the wiping target head is input by a user from the operation panel in a case of manual maintenance performed by the user. For example, in a case of automatic maintenance or the like that is activated with time, the selection information for the wiping target head is information automatically selected in accordance with the control content.

The wiping operation controller 501 reads information about a previous wiping target head from the wiping target head storage unit 502 (S2), and determines the winding length (winding amount) based on the combination of the information about the previous wiping target head and the information about the current wiping target head (S3). The wiping operation controller 501 controls the driving of the winding motor 241 to perform a winding operation of winding the web 211 by the determined winding length (S4).

The wiping operation controller 501 moves up the pressing body (the first pressing body 214A or the second pressing body 214B) corresponding to the wiping target head (the first head 110A or the second head 110B) to press the web 211 against the wiping target head (S5).

That is, when the wiping target head is the first head 110A, the driving of the first pressing body elevation motor 242 is controlled, the first pressing body 214A is moved up to the contact position, and the web 211 is pressed against the nozzle face 111 of the first head 110A. When the wiping target head is the second head 110B, the driving of the second pressing body elevation motor 243 is controlled, the second pressing body 214B is moved up to the contact position, and the web 211 is pressed against the nozzle face 111 of the second head 110B.

The wiping operation controller 501 moves the web cartridge 201 in the wiping direction to perform the wiping operation of wiping the nozzle face 111 of the wiping target head (the first head 110A or the second head 110B) with the web 211 (S6). After the wiping operation is completed, the wiping operation controller 501 moves down the pressing body (the first pressing body 214A or the second pressing body 214B) that has been moved up, to the separated position (or the retracted position), and separates the pressing body from the web 211 (S7).

The wiping operation controller 501 writes and stores information about the wiping target head (the first head 110A or the second head 110B) on which the wiping operation has been performed, in the wiping target head storage unit 502 (S8), and the processing is ended.

In the present embodiment, the first pressing body 214A and the second pressing body 214B come into contact with the web 211 before the wiping operation (S5), the first pressing body 214A and the second pressing body 214B come off the web 211 after the wiping operation (S7), and the winding timing of the web 211 is after the wiping target head is selected and before the first pressing body 214A or the second pressing body 214B comes into contact with the web 211 (S4).

That is, in the present embodiment, since the winding length of the web is controlled based on the combination of the previous wiping target head and the current wiping target head, the winding timing of the web is before wiping (during the period from the determination of the wiping target head to the start of the wiping operation) instead of after wiping. However, determining the winding timing of the web before the start of the wiping operation may cause a disadvantage that the web and the pressing body adhere to each other. Thus, by performing control to separate the pressing body from the web after wiping, even though the web is wound before wiping, the pressing body and the web can be prevented from adhering to each other.

A first example of a combination of wiping sequences of the wiping target heads and winding lengths L of the web is described below referring to FIG. 12. In this case, the first pressing body 214A is presented when the first head 110A is a wiping target head, and the second pressing body 214B is presented when the second head 110B is a wiping target head.

Figure 12:
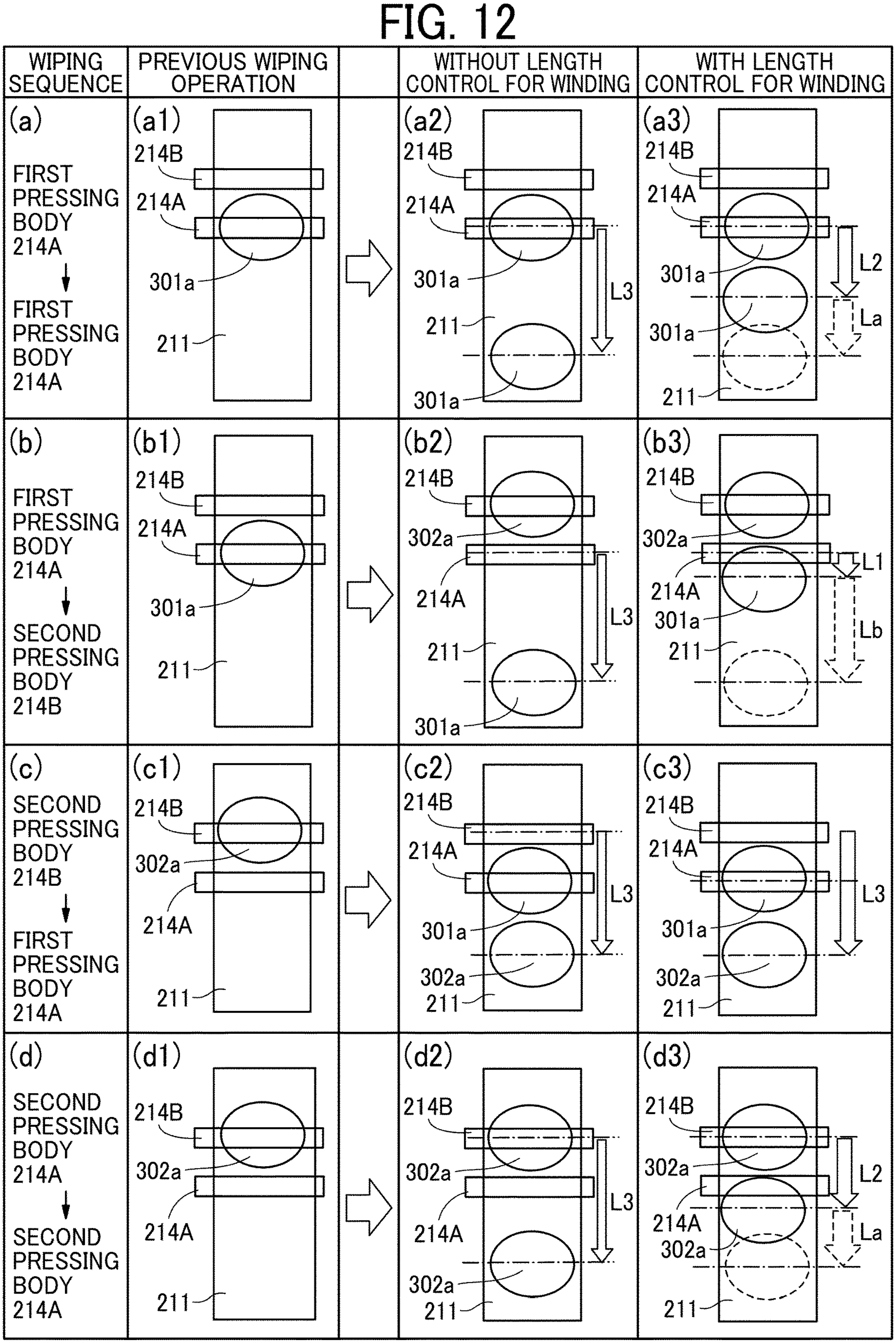
FIG. 12 is a table presenting a first example of a combination of wiping sequences of wiping target heads and winding lengths L of a web.

FIG. 12(*a*) presents a case where the wiping sequence is from "the first pressing body 214A" to "the first pressing body 214A", that is, the first head 110A is continuously wiped two times.

In this case, the previous wiping target head is the first pressing body 214A, and as illustrated in FIG. 12(*a*1), a stain 301*a* due to the treatment liquid 301 is generated on the web 211 by the previous wiping operation.

When the winding length is not controlled, as illustrated in FIG. 12(*a*2), regardless of whether the wiping target head is the second head 110B or the first head 110A, a winding length L3 that does not cause interference between a stain 302*a* of the ink and the stain 301*a* of the treatment liquid 301 is desired.

Thus, when the winding length is not controlled, as illustrated in FIG. 12(*a*2), the web 211 is wound by the winding length L3.

In contrast, when the winding length is controlled like the present embodiment, as illustrated in FIG. 12(*a*3), the web 211 is wound by a winding length L2 (L2<L3) with which stains 301*a* of the treatment liquid 301 do not interfere with each other. Thus, the amount of use of the web 211 is reduced by a length La.

FIG. 12(*b*) presents a case where the wiping sequence is from "the first pressing body 214A" to "the second pressing body 214B", that is, a case where wiping is performed in the order from the first head 110A to the second head 110B.

In this case, the previous wiping target head is the first pressing body 214A, and as illustrated in FIG. 12(*b*1), a stain 301*a* due to the treatment liquid 301 is generated on the web 211 by the previous wiping operation.

When the winding length is not controlled, as illustrated in FIG. 12(*b*2), the web 211 is wound by the winding length L3.

In contrast, when the winding length is controlled like the present embodiment, as illustrated in FIG. 12(*b*3), the web 211 is wound by a winding length L1 (L1<L2<L3) with which the stain 301*a* of the treatment liquid 301 and a stain 302*a* of the ink 302 do not interfere with each other. Thus, the amount of use of the web 211 is reduced by a length Lb (Lb>La).

FIG. 12(*c*) presents a case where the wiping sequence is from "the second pressing body 214B" to "the first pressing body 214A", that is, a case where wiping is performed in the order from the second head 110B to the first head 110A.

In this case, the previous wiping target head is the second pressing body 214B, and as illustrated in FIG. 12(*c*1), a stain 302*a* due to the ink 302 is generated on the web 211 by the previous wiping operation.

When the winding length is not controlled, as illustrated in FIG. 12(*c*2), the web 211 is wound by the winding length L3.

Even when the winding length is controlled like the present embodiment, as illustrated in FIG. 12(*c*3), the web 211 is wound by the winding length L3 with which the stain 302*a* of the ink 302 and a stain 301*a* of the treatment liquid 301 do not interfere with each other.

FIG. 12(*d*) presents a case where the wiping sequence is from "the second pressing body 214B" to "the second pressing body 214B", that is, the second head 110B is continuously wiped two times.

In this case, the previous wiping target head is the second pressing body 214B, and as illustrated in FIG. 12(*d*1), a stain 302*a* due to the ink 302 is generated on the web 211 by the previous wiping operation.

When the winding length is not controlled, as illustrated in FIG. 12(*d*2), the web 211 is wound by the winding length L3.

In contrast, when the winding length is controlled like the present embodiment, as illustrated in FIG. 12(*d*3), the web 211 is wound by the winding length L2 (L2<L3) with which stains 302*a* of the ink 302 do not interfere with each other. Thus, the amount of use of the web 211 is reduced by the length La.

As described above, the winding length (winding amount) is changed based on the combination of the previous wiping target head and the current wiping target head, thereby eliminating waste of the web and efficiently using the web.

A second example of a combination of wiping sequences of the wiping target heads and winding lengths L of the web is described below referring to FIG. 13.

Figure 13:
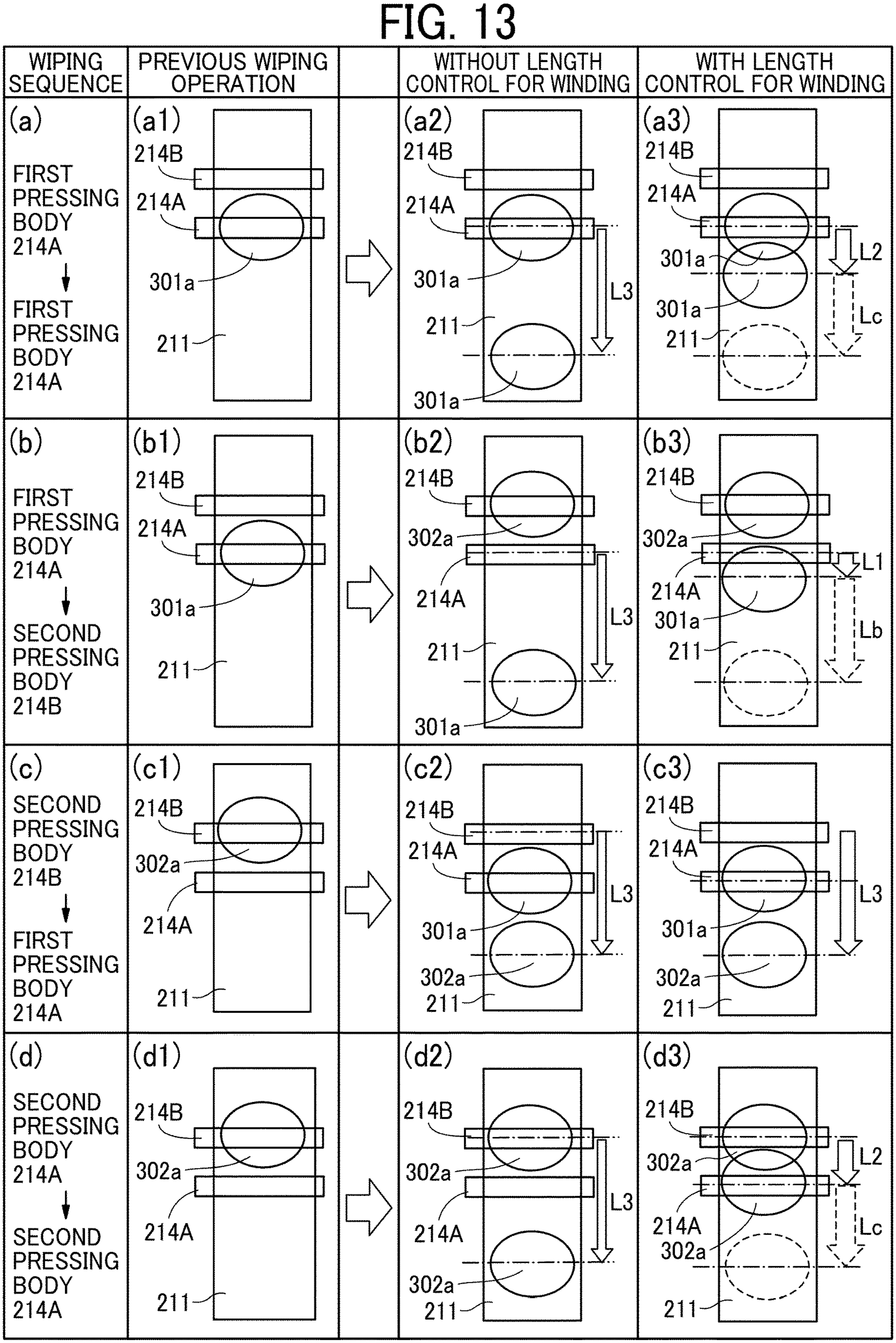
FIG. 13 is a table presenting a second example of a combination of wiping sequences of the wiping target heads and winding lengths L of the web.

As illustrated in FIG. 13(*a*3), the winding length L2 when the wiping sequence is from "the first pressing body 214A" to "the first pressing body 214A", that is, when the first head 110A is continuously wiped two times, is determined as a length with which stains 301*a* of the treatment liquid 301 partially overlap each other. That is, the winding length L2 in this case is smaller than the length L3 by a length Lc (Lc>La), and is smaller than the length of the first example.

Similarly, as illustrated in FIG. 13(*d*3), the winding length L2 when the wiping sequence is from "the second pressing body 214B" to "the second pressing body 214B", that is, when the second head 110B is continuously wiped two times, is determined as a length with which stains 302*a* of the ink 302 partially overlap each other. That is, the winding length L2 in this case is smaller than the length L3 by the length Lc (Lc>La), and is smaller than the length of the first example.

The length of the portions that partially overlap each other is a length that is about half or less of the length of the stain 301*a* or 302*a* in the feeding direction of the web 211, and is preferably a length with which the stains do not overlap each other at a position immediately above the first pressing body 214A or the second pressing body 214B.

Thus, the amount of use of the web 211 is reduced as compared with that in the first example, and the web 211 can be used more efficiently.

Figures 14, 15:
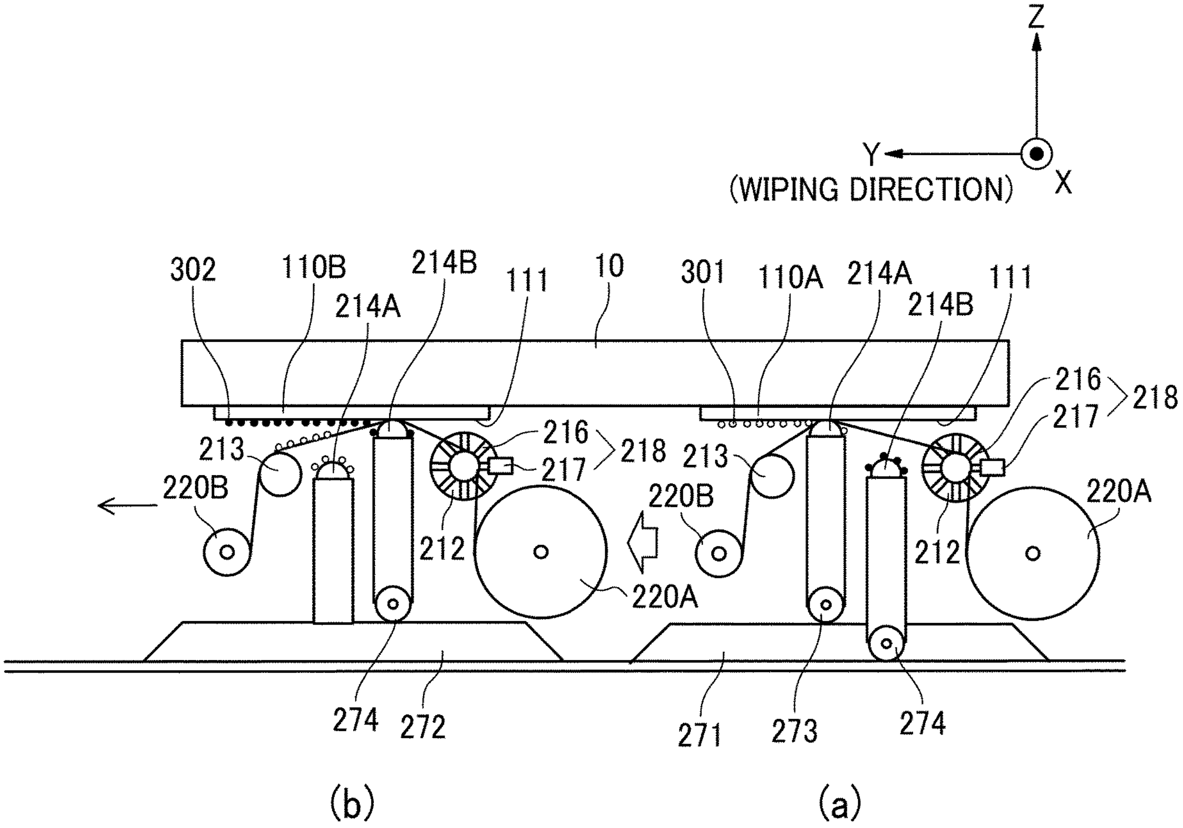
FIG. 14 is a table presenting an example of the relationship between the wiping target head (pressing body) and the winding length.
FIG. 15 is a side view of a main portion of a wiping device according to a second embodiment of the disclosure.

FIG. 14 presents the relationship between the wiping target head (pressing body) and the winding length according to the above-described first example and second example.

That is, when a first head and a second head denote two heads being adjacent to each other in the wiping direction among the multiple heads and numbered from the downstream side in the wiping direction of the web, L1 denotes a winding length of the web in a case where the first head and the second head are wiped in this order, L2 denotes a winding length of the web in a case where one of the heads is continuously wiped two times, and L3 denotes a winding length of the web in a case where the second head and the first head are wiped in this order, the winding lengths have a relationship of L3>L2>L1.

Thus, the efficiency of the amount of use of the web can be increased while different liquids are prevented from being mixed with each other.

A second embodiment of the disclosure is described below referring to FIG. 15. FIG. 15 is a side view of a main portion of a wiping device according to the second embodiment.

In the present embodiment, a first elevation guide 271 and a second elevation guide 272 are provided. The first elevation guide 271 moves up and down (vertically moves) a first pressing body 214A. The second elevation guide 272 moves up and down (vertically moves) a second pressing body 214B. The first pressing body 214A includes a contact roller 273 that follows the first elevation guide 271. The second pressing body 214B includes a contact roller 274 that follows the second elevation guide 272.

The first elevation guide 271 is disposed to correspond to the position of the first head 110A of the carriage 10. The second elevation guide 272 is disposed to correspond to the position of the second head 110B of the carriage 10.

With such a configuration, when the web cartridge 201 moves in the wiping direction (sub-scanning direction Y), the contact roller 273 of the first pressing body 214A rides on the first elevation guide 271. Thus, the first pressing body 214A moves up to the contact position and presses the web 211 against the first head 110A.

In this state, when the wiping operation on the first head 110A is ended and the web cartridge 201 moves in the wiping direction (sub-scanning direction Y), the contact roller 273 of the first pressing body 214A comes off the first elevation guide 271, and the first pressing body 214A moves down to the separated position.

In this state, the web 211 is wound. Then, when the web cartridge 201 further moves in the wiping direction (sub-scanning direction Y), the contact roller 274 of the second pressing body 214B rides on the second elevation guide 272. Thus, the second pressing body 214B moves up to the contact position and presses the web 211 against the second head 110B.

According to this embodiment, as compared with the first embodiment, drive sources that individually move up and down the first pressing body 214A and the second pressing body 214B are no longer used, and the configuration is simplified.

Figure 16:
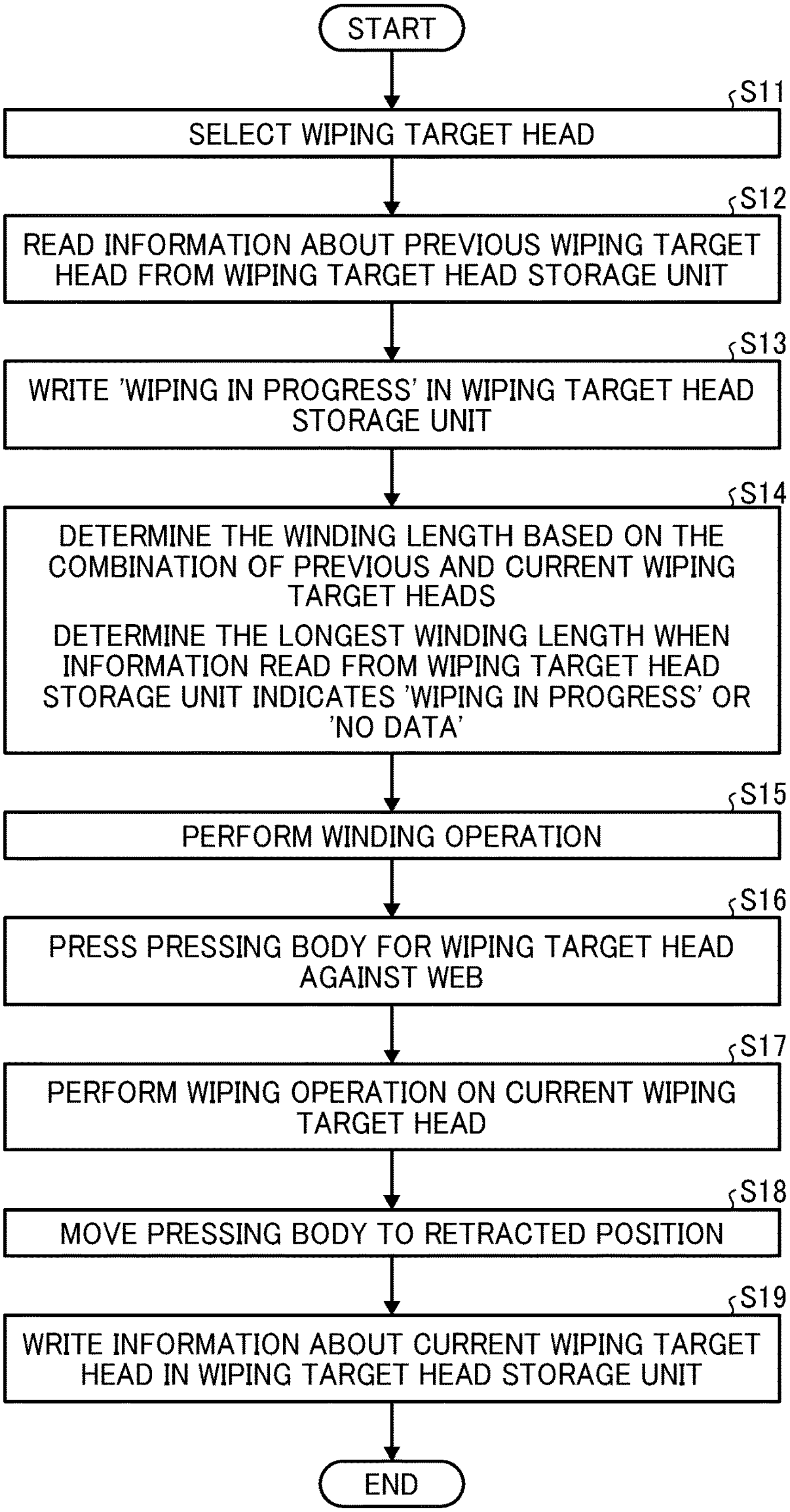
FIG. 16 is a flowchart presenting control of a wiping operation performed by a wiping operation controller of a wiping device according to a third embodiment of the disclosure.

A third embodiment of the disclosure is described below referring to FIG. 16. FIG. 16 is a flowchart presenting control of a wiping operation performed by a wiping operation controller of a wiping device according to the third embodiment.

When the wiping operation is started, the wiping operation controller 501 selects a current wiping target head based on selection information for a wiping target head (S11). The selection information for the wiping target head is input by a user from the operation panel in a case of manual maintenance performed by the user. For example, in a case of automatic maintenance or the like that is activated with time, the selection information for the wiping target head is information automatically selected in accordance with the control content.

The wiping operation controller 501 reads information about a previous wiping target head from the wiping target head storage unit 502 (S12). The wiping operation controller 501 writes information of 'wiping in progress' in the wiping target head storage unit 502 (S13).

The wiping operation controller 501 determines the winding length (winding amount) based on the combination of the information about the previous wiping target head and the information about the current wiping target head (S14). In this case, the wiping operation controller 501 determines the longest winding length when the information read from the wiping target head storage unit 502 indicates 'wiping in progress' or 'no data' (new or damaged data).

The wiping operation controller 501 controls the driving of the winding motor 241 to perform a winding operation of winding the web 211 by the determined winding length (S15).

The wiping operation controller 501 moves up the pressing body (the first pressing body 214A or the second pressing body 214B) corresponding to the wiping target head (the first head 110A or the second head 110B) to press the web 211 against the wiping target head (S16).

That is, when the wiping target head is the first head 110A, the driving of the first pressing body elevation motor 242 is controlled, the first pressing body 214A is moved up to the contact position, and the web 211 is pressed against the nozzle face 111 of the first head 110A. When the wiping target head is the second head 110B, the driving of the second pressing body elevation motor 243 is controlled, the second pressing body 214B is moved up to the contact position, and the web 211 is pressed against the nozzle face 111 of the second head 110B.

The wiping operation controller 501 moves the web cartridge 201 in the wiping direction to perform the wiping operation of wiping the nozzle face 111 of the wiping target head (the first head 110A or the second head 110B) with the web 211 (S17). After the wiping operation is completed, the wiping operation controller 501 moves down the pressing body (the first pressing body 214A or the second pressing body 214B) that has been moved up, to the separated position (or the retracted position), and separates the pressing body from the web 211 (S18).

The wiping operation controller 501 writes and stores information about the wiping target head (the first head 110A or the second head 110B) on which the wiping operation has been performed, in the wiping target head storage unit 502 (S19).

When a trouble such as abnormal end or damage to data occurs during the wiping operation, a deviation may occur between the actual level of the contamination of the web 211 and the information in the wiping target head storage unit 502. In this case, for example, when a short winding length is selected, the winding length is insufficient, wiping is performed with a contaminated portion of the web 211, and a defect of the head may occur.

Thus, after the information about the previous wiping target head is read, 'wiping in progress' information is written in the wiping target head storage unit 502. When the winding length is determined, and when the information read from the wiping target head storage unit 502 indicates 'wiping in progress' or 'no data' (new or damaged data), the largest winding length among selectable winding lengths is determined.

Thus, the nozzle face can be prevented from being wiped with a contaminated portion of the web when the wiping operation is abnormally ended or when data is damaged.

Figure 17:
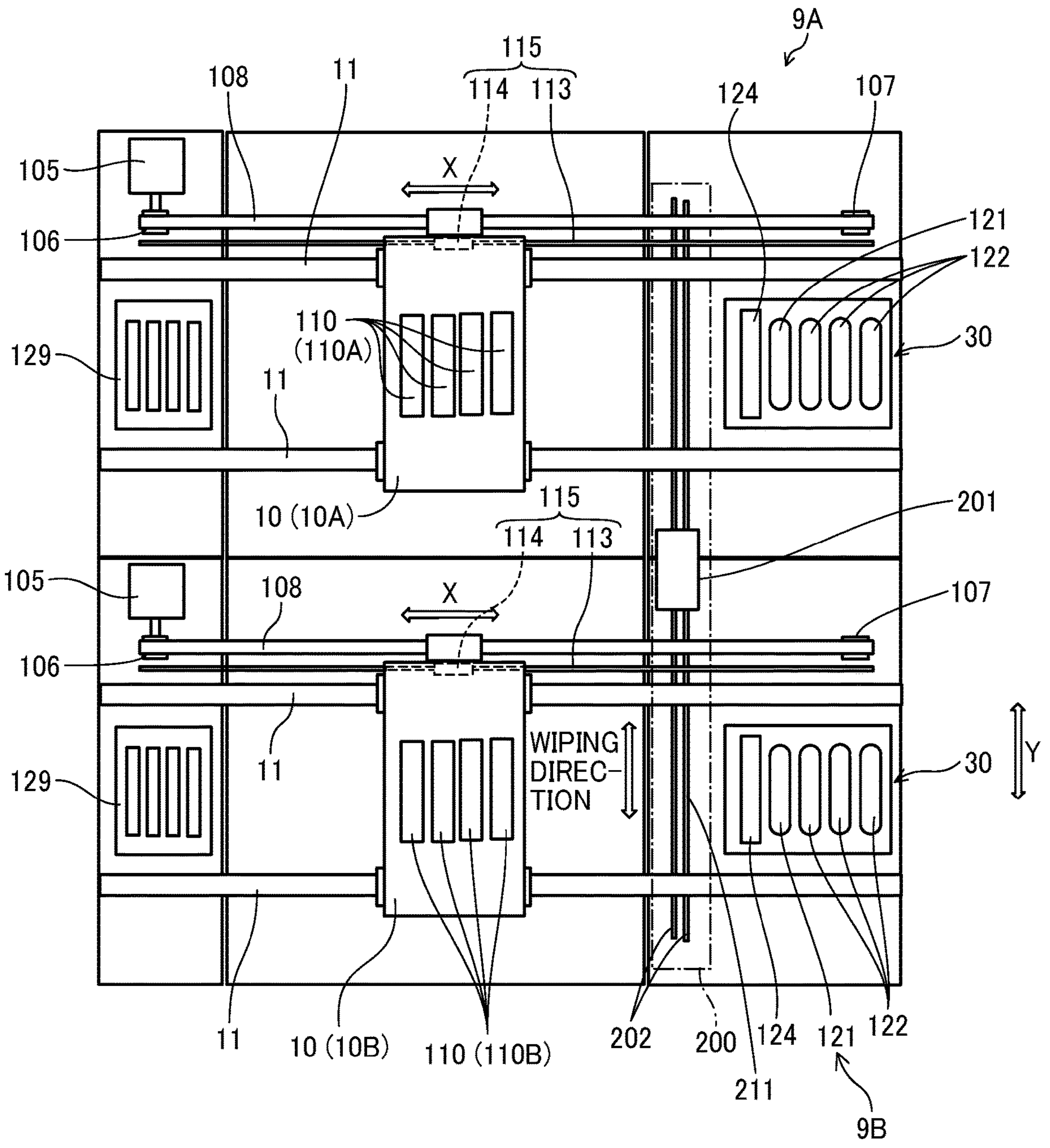
FIG. 17 is a plan view of liquid discharge units and a wiping device according to a fourth embodiment of the disclosure.

A fourth embodiment of the disclosure is described below referring to FIG. 17. FIG. 17 is a plan view of liquid discharge units and a wiping device according to the fourth embodiment.

In the present embodiment, two liquid discharge units 9A and 9B include different carriages 10 (10A and 10B). The liquid discharge units 9 (9A and 9B) respectively include the carriages 10 (10A and 10B) that each are held by two guide rods 11 bridged between left and right side plates so as to reciprocate in the main scanning direction X. The carriages 10A and 10B each are reciprocated in the main scanning direction X by a main scanning motor 105 via a timing belt 108 looped around a driving pulley 106 and a driven pulley 107.

A first head 110A is mounted on the carriage 10A. A second head 110B is mounted on the carriage 10B.

A linear encoder 115 is also provided for each of the carriages 10A and 10B.

The other configurations are similar to those in the above-described first embodiment.

The wiping device 200 according to the fourth embodiment of the disclosure is disposed to extend over the two liquid discharge units 9A and 9B like the first embodiment.

Thus, when both the carriages 10A and 10B are set at the wiping positions by the wiping device 200 and the first head 110A and the second head 110B are wiped, the control of the wiping operation according to the first embodiment is performed to efficiently use the web 211.

Figure 18:
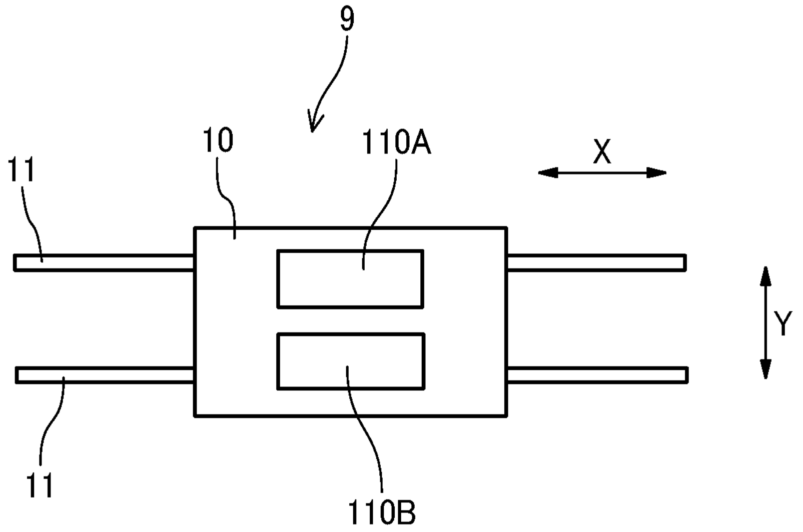
FIG. 18 is a plan view of a carriage in view from nozzle faces of heads according to a fifth embodiment of the disclosure.

A fifth embodiment of the disclosure is described below referring to FIG. 18. FIG. 18 is a plan view of a carriage in view from nozzle faces of heads according to the fifth embodiment.

In the present embodiment, a carriage 10 includes a first head 110A that discharges a first liquid and a second head 110B that discharges a second liquid. The first head 110A and the second head 110B have the longitudinal directions in a direction extending in the main scanning direction X. In this case, for example, the second head 110B discharges a white liquid or a color liquid, and the first head 110A discharges a pretreatment liquid.

Figure 19:
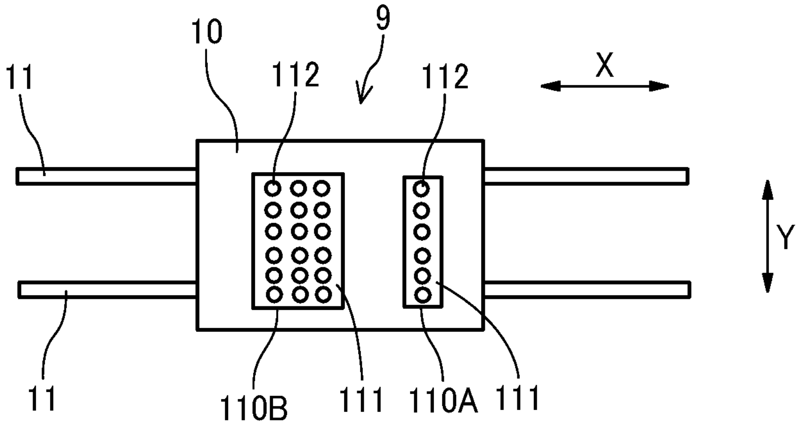
FIG. 19 is a plan view of a carriage in view from nozzle faces of heads according to a sixth embodiment of the disclosure.

A sixth embodiment of the disclosure is described below referring to FIG. 19. FIG. 19 is a plan view of a carriage in view from nozzle faces of heads according to the sixth embodiment.

In the present embodiment, a carriage 10 includes a first head 110A and a second head 110B. The first head 110A has multiple discharge port arrays each having multiple discharge ports 112 through which a first liquid is discharged.

The second head 110B has a discharge port array having multiple discharge ports 112 through which a second liquid is discharged.

The first head 110A and the second head 110B have the longitudinal directions in a direction extending in the sub-scanning direction Y orthogonal to the main scanning direction X. In this case, for example, the second head 110B discharges a white liquid or a color liquid, and the first head 110A discharges a pretreatment liquid.

The above-described embodiments can be combined with each other within an allowable range. The disclosure is not limited to the case where the first head discharges the treatment liquid and the second head discharges the ink.

For example, the disclosure is applied to a case where multiple heads that discharge different liquids are wiped with a common web, such as a case where a first head discharges a white ink and a second head discharges a color ink, to efficiently use the web while preventing the different liquids from being mixed with each other.

Figure 20:
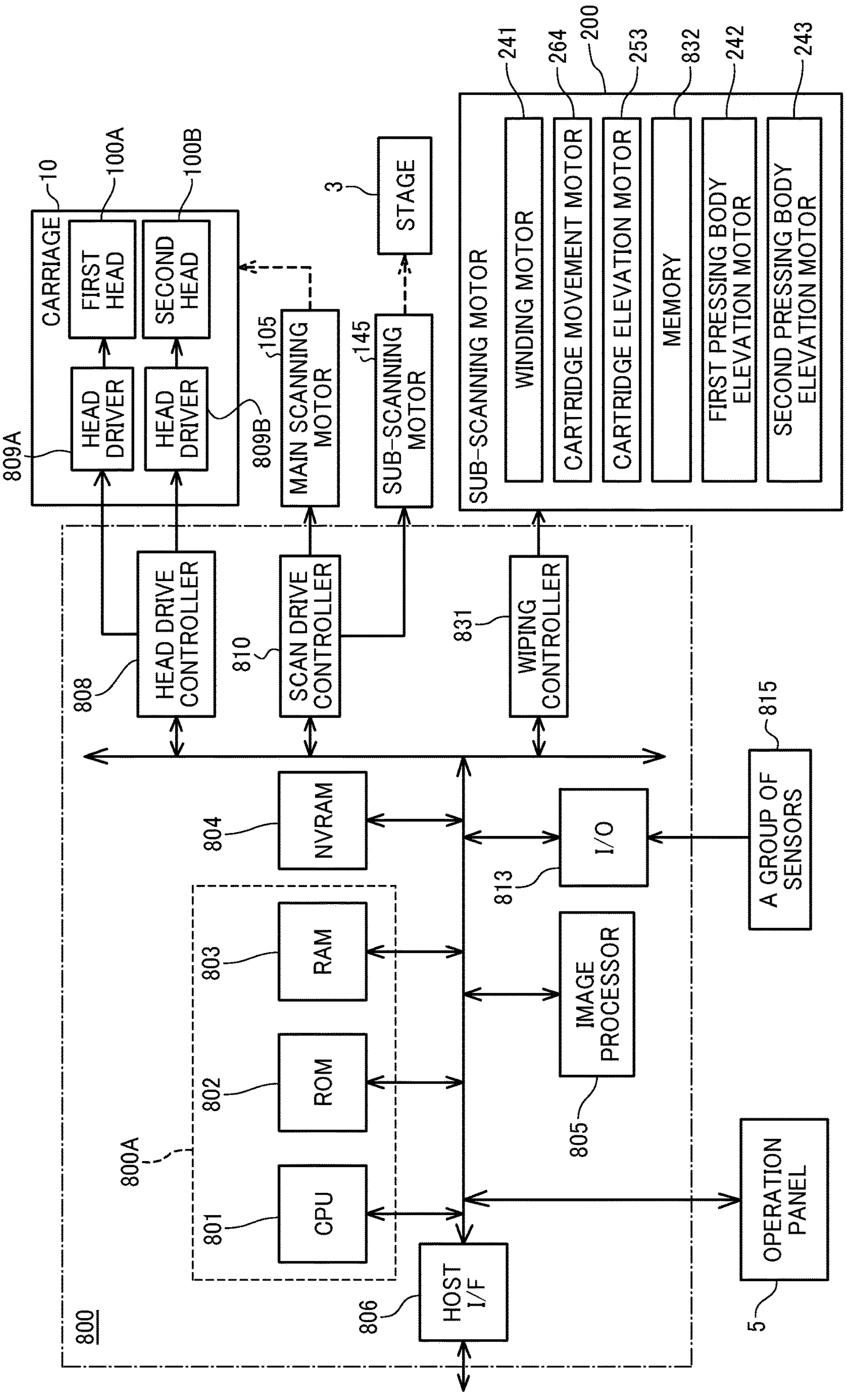
FIG. 20 is a block diagram illustrating an example of a controller of a printer.

An example of a controller of a printer is described below referring to a block diagram of FIG. 20.

A controller 800 includes a main controller 800A including a central processing unit (CPU) 801, a read-only memory (ROM) 802, and a random-access memory (RAM) 803. The CPU 801 controls the entire apparatus (printer 1). The ROM 802 stores fixed data such as various programs to be executed by the CPU 801. The RAM 803 temporarily stores image data or the like.

The controller 800 further includes a non-volatile random-access memory (NVRAM) 804 and an image processor 805. The NVRAM 804 is a rewritable memory that retains data even when the apparatus (printer 1) is powered off. The image processor 805 processes various signals on image data, performs sorting or other image processing, and processes input and output signals to control the entire apparatus (printer 1).

The controller 800 includes a head drive controller 808, a head driver 809A, and a head driver 809B. The head drive controller 808 includes a data transfer unit and a drive signal generation unit to control the driving of heads 101. The head driver 809A drives a first head 101A. The head driver 809B drives a second head 101B.

The controller 800 includes a scan drive controller 810 that drives the main scanning motor 105 that moves and scans the carriage 10 and a sub-scanning motor 145 that moves the stage 3.

The controller 800 includes an input/output (I/O) unit 813. The I/O unit 813 acquires information from a group of sensors 815 including a temperature sensor and various other sensors attached to the apparatus (printer 1), extracts information used for control of the apparatus (printer 1), and uses the information for various types of control.

The controller 800 is connected to the operation panel 5 to input and display information used for the apparatus (printer 1).

The controller 800 includes a host I/F 806 to transmit or receive data or signals to or from a host, and receives data or signals from the host via a cable or a network. The host is, for example, an information processing device such as a personal computer, an image reading device, or an image-capturing device.

The controller 800 includes a wiping controller 831 that controls the wiping device 200. The wiping controller 831 includes the wiping operation controller 501. The wiping controller 831 controls the driving of the winding motor 241, the cartridge movement motor 264, the cartridge elevation motor 253, the first pressing body elevation motor 242, and the second pressing body elevation motor 243 to control the wiping operation.

The wiping controller 831 controls reading and writing of information about a previous wiping target head stored in a memory 832 also serving as the wiping target head storage unit 502, and controls writing during wiping in progress.

In any of the embodiments of the disclosure, the liquid to be discharged is not limited to a particular liquid as long as the liquid has a viscosity or surface tension to be discharged from a head (liquid discharge head). However, preferably, the viscosity of the liquid is not greater than 30 mPa's under ordinary temperature and ordinary pressure or by heating or cooling. Examples of the liquid to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; or an edible material, such as a natural colorant. Such a solution, a suspension, or an emulsion can be used for, e.g., an inkjet ink; a surface treatment liquid; a liquid for forming an electronic element component, a light-emitting element component, or an electronic circuit resist pattern; or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric transducer element, such as a thermal resistor, and an electrostatic actuator including a diaphragm and a counter electrode.

The term "liquid discharge apparatus" used herein represents an apparatus including the liquid discharge head to drive the liquid discharge head to discharge liquid. The liquid discharge apparatus may be, for example, an apparatus that can discharge liquid to a material onto which liquid can adhere or an apparatus to discharge liquid toward gas or into liquid.

The "liquid discharge apparatus" may include devices to feed, convey, and eject the material onto which liquid can adhere. The liquid discharge apparatus may further include a pretreatment apparatus to apply a treatment liquid onto the material, and a post-treatment apparatus to apply a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which a powder material is formed in a layer to form a three-dimensional fabrication object.

The "liquid discharge apparatus" is not limited to an apparatus to discharge liquid to visualize meaningful images, such as letters or figures. For example, the liquid discharge apparatus may be an apparatus to form meaningless images, such as meaningless patterns, or fabricate three-dimensional images.

The above-described term "material onto which liquid can adhere" represents a material onto which liquid at least temporarily adheres, a material onto which liquid adheres and is fixed, or a material into which liquid adheres to permeate. Examples of the "material onto which liquid can adhere" include recording media, such as a sheet, recording paper, a recording sheet of paper, film, and cloth; electronic components, such as an electronic substrate and a piezoelectric element; and media, such as a powder layer, an organ model, and a testing cell. The "material onto which liquid can adhere" includes any material onto which liquid can adhere, unless particularly limited.

Examples of the "material onto which liquid can adhere" include any materials onto which liquid can adhere even temporarily, such as paper, thread, fiber, fabric, leather, metal, plastic, glass, wood, and ceramic.

The "liquid discharge apparatus" may be an apparatus to relatively move the liquid discharge head and a material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the "liquid discharge apparatus" further include a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particles of the raw material.

Aspects of the disclosure are, for example, as follows.

[1]

In Aspect 1, a wiping device includes a common web that wipes multiple heads that discharge different liquids; a controller that controls a wiping operation with the web; and a memory that stores a previous wiping target head that has been wiped with the web. The controller performs control to change a winding length of the web based on a combination of the previous wiping target head stored in the memory and a wiping target head to be wiped next. In other words, a wiping device includes a web windable for a winding length; a memory; circuitry configured to: cause the web to wipe in a wiping direction: a first head to discharge a first type of liquid; and a second head to discharge a second type of liquid different from the first type of liquid; and cause the memory to store information about one of the first head or the second head that has been previously wiped with the web; and change the winding length of the web based on a combination of: the information about the one of the first head or the second head stored in the memory; and information about another of the first head or the second head to be wiped after the one of the first head or the second head.

[2]

According to Aspect 2, the wiping device of Aspect 1 further includes multiple pressing bodies that each press the web against corresponding one of the multiple heads. The pressing body is movable between a contact position at which the pressing body presses the web against the head and a separated position separated from the contact position. The pressing body comes into contact with the web before the wiping operation. The pressing body comes off the web after the wiping operation. A winding timing of the web is after the wiping target head is selected and before the pressing body comes into contact with the wiping target head. In other words, the wiping device, further includes a first pressing part to press the web against the first head; and a second pressing part to press the web against the second head. Each of the first pressing part and the second pressing part movable between: a contact position at which the first pressing part and the second pressing part press the web against the first head and the second head, respectively; and a separated position at which the first pressing part and the second pressing part are moved away from the contact position. The circuitry is further configured to: cause one of the first pressing part or the second pressing part to contact the web before wiping corresponding the one of the first head or the second head; cause the one of the first pressing part or the second pressing part to move away from the web after wiping corresponding the one of the first head or the second head; and cause the web to wind the winding length at a winding timing after a selection of the one of the first head or the second head to be wiped and before the one of the first pressing part or the second pressing part presses the web against corresponding the one of the first head or the second head.

[3]

According to Aspect 3, in the wiping device of Aspect 1 or Aspect 2, when a first head and a second head denote two heads being adjacent to each other in a wiping direction among the multiple heads and numbered from a downstream side in the wiping direction of the web, L1 denotes a winding length of the web in a case where the first head and the second head are wiped in this order, L2 denotes a winding length of the web in a case where one of the heads is continuously wiped two times, and L3 denotes a winding length of the web in a case where the second head and the first head are wiped in this order, the winding lengths have a relationship of $L3>L2>L1$. In other words, the second head is adjacent to and downstream from the first head in the wiping direction. The circuitry is further configured to: cause the first pressing part to wipe the first head followed by causing the second pressing part to wipe the second head in a first wiping operation; cause the first pressing part to wipe the first head twice or cause the second pressing part to wipe the second head twice in a second wiping operation; and cause the second pressing part to wipe the second head followed by causing the first pressing part to wipe the first head in a third wiping operation; the winding length of the web has a relationship of $L3>L2>L1$, where L1 denotes a winding length of the web during the first wiping operation; L2 denotes a winding length of the web during the second wiping operation, and L3 denotes a winding length of the web during the third wiping operation.

[4]

According to Aspect 4, in the wiping device of any one of Aspect 1 to Aspect 3, the controller stores information indicating wiping in progress while the wiping operation is performed on the wiping target head, and in a case where the winding length of the web is determined, determines a selectable largest winding length as long as the information indicating the wiping in progress is stored for the previous wiping target head. In other words, the circuitry is further configured to: store, in the memory, information indicating wiping in progress during wiping the one of the first head or the second head; and set a longest winding length of the web for wiping the one of the first head or the second head within a selectable range when the information indicating wiping in progress is stored in the memory for the one of the first head or the second head.

[5]

In Aspect 5, a liquid discharge apparatus includes multiple heads that discharge different liquids; and the wiping device of any one of Aspect 1 to Aspect 4. In other words, a liquid discharge apparatus includes the wiping device described above and multiple heads including the first head and the second head.

[6]

According to Aspect 6, in the liquid discharge apparatus of Aspect 5, the multiple heads include a head that discharges a treatment liquid; and a head that discharges an ink reactive with the treatment liquid. In the liquid discharge apparatus, the first head discharges a treatment liquid; and the second head discharges an ink reactive with the treatment liquid.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A wiping device comprising:
a web windable for a winding length;
a memory;
circuitry configured to:
cause the web to wipe in a wiping direction:
a first head to discharge a first type of liquid; and
a second head to discharge a second type of liquid different from the first type of liquid; and
cause the memory to store information about one of the first head or the second head that has been previously wiped with the web; and
change the winding length of the web based on a combination of:
the information about the one of the first head or the second head stored in the memory; and
information about another of the first head or the second head to be wiped after the one of the first head or the second head.

2. The wiping device according to claim 1, further comprising:
a first pressing part to press the web against the first head; and
a second pressing part to press the web against the second head,
each of the first pressing part and the second pressing part movable between:
a contact position at which the first pressing part and the second pressing part press the web against the first head and the second head, respectively; and
a separated position at which the first pressing part and the second pressing part are moved away from the contact position,
wherein the circuitry is further configured to:
cause one of the first pressing part or the second pressing part to contact the web before wiping corresponding the one of the first head or the second head;
cause the one of the first pressing part or the second pressing part to move away from the web after wiping corresponding the one of the first head or the second head; and
cause the web to wind the winding length at a winding timing:
after a selection of the one of the first head or the second head to be wiped; and
before the one of the first pressing part or the second pressing part presses the web against corresponding the one of the first head or the second head.

3. The wiping device according to claim 2, wherein the second head is adjacent to and downstream from the first head in the wiping direction,
the circuitry is further configured to:
cause the first pressing part to wipe the first head followed by causing the second pressing part to wipe the second head in a first wiping operation;
cause the first pressing part to wipe the first head twice or cause the second pressing part to wipe the second head twice in a second wiping operation; and
cause the second pressing part to wipe the second head followed by causing the first pressing part to wipe the first head in a third wiping operation,
wherein the winding length of the web has a relationship of $L3>L2>L1$,
where
L1 denotes a winding length of the web during the first wiping operation;
L2 denotes a winding length of the web during the second wiping operation, and
L3 denotes a winding length of the web during the third wiping operation.

4. The wiping device according to claim 1,
wherein the circuitry is further configured to:
store, in the memory, information indicating wiping in progress during wiping the one of the first head or the second head; and
set a longest winding length of the web for wiping the one of the first head or the second head within a selectable range when the information indicating wiping in progress is stored in the memory for the one of the first head or the second head.

5. A liquid discharge apparatus comprising:
the wiping device according to claim 1; and
multiple heads including the first head and the second head.

6. The liquid discharge apparatus according to claim 5,
wherein the first head discharges a treatment liquid; and
the second head discharges an ink reactive with the treatment liquid.

* * * * *